E. LANGE.
PUZZLE.
APPLICATION FILED NOV. 29, 1919.

1,389,198.

Patented Aug. 30, 1921.
2 SHEETS—SHEET 1.

Inventor
E. Lange
By. C.S.Fetherstonhaugh
Attorney

E. LANGE.
PUZZLE.
APPLICATION FILED NOV. 29, 1919.

1,389,198.

Patented Aug. 30, 1921.
2 SHEETS—SHEET 2.

UNITED STATES PATENT OFFICE.

EMIL LANGE, OF MONTREAL, QUEBEC, CANADA.

PUZZLE.

1,389,198.      Specification of Letters Patent.      Patented Aug. 30, 1921.

Application filed November 29, 1919. Serial No. 341,538.

*To all whom it may concern:*

Be it known that I, EMIL LANGE, a subject of the King of Great Britain, and residing at 307 Craig street west, in the city and district of Montreal, in the Province of Quebec, in the Dominion of Canada, have invented a new and useful Puzzle, of which the following is the specification.

The invention relates to a puzzle as described in the present specification and illustrated in the accompanying drawings that form part of the same.

The invention consists essentially of the novel arrangement of rotating disks in relation to an intermediate stationary board or sheet with particular reference to the number of pictures or characters appearing to the eye in the different positions of the disks.

The objects of the invention are primarily to amuse the people by a most interesting mystery, in which it will be found that one figure disappears entirely without apparent cause and the natural question arises, What has become of it? Secondly it is desired to furnish a most inviting instrument to the advertising field, which is the means of attracting thousands of curious people and holding them by reason of their natural inquisitiveness to ascertain the cause of the disappearance and thereby keep constantly before their eyes one or more advertisements well and tastefully displayed; and finally to provide healthy and concentrative occupation for the minds of those persons, who are alert and interested in any problem that may be brought to their attention.

In the drawings, Figure 1 is a plan view of the board, showing the outer disk and only twelve figures appearing partly on board and partly on disk.

Like numerals of reference indicate corresponding parts in each figure.

Figure 2:
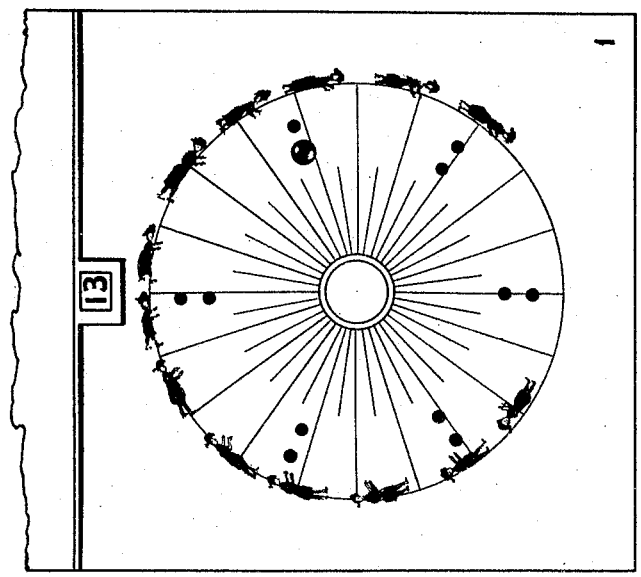
Fig. 2 is a similar view, showing thirteen figures.
Figure 1:
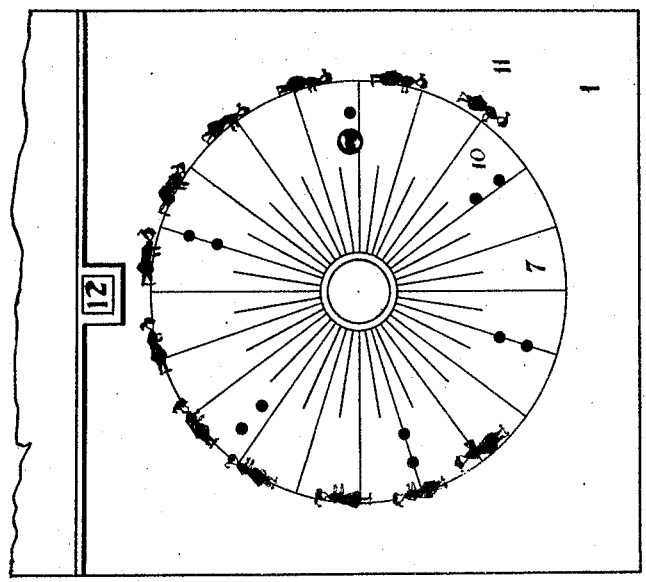
Figure 4:
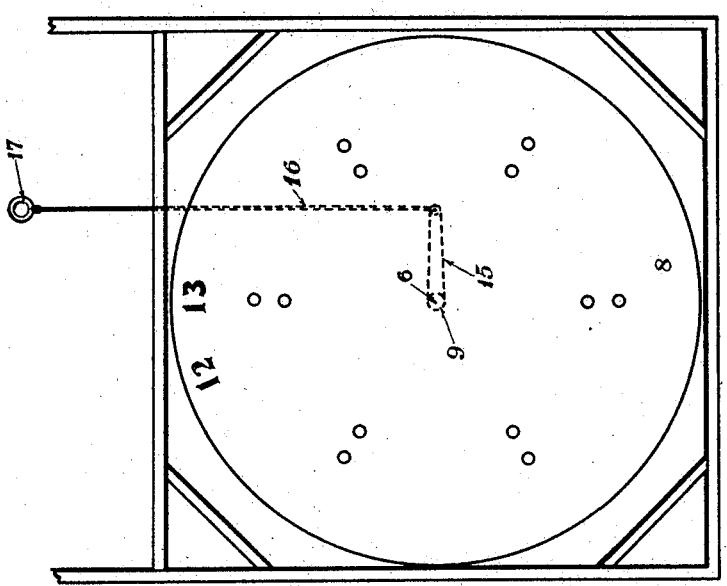
Fig. 4 is a detail of the outer disk.
Figure 3:
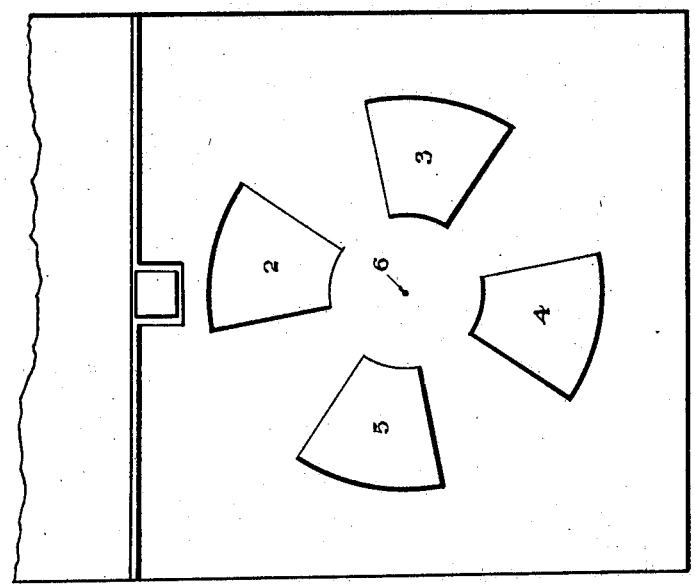
Fig. 3 is a detail of the board or intermediate sheet.

Referring to the drawings, the board or sheet 1 is formed of any comparatively thin sheet material such as good cardboard, thin wood or sheet metal and has the slots 2, 3, 4 and 5 concentric with an imaginary circle surrounding the central pivot bearing 6.

The disk 7 made of cardboard or other suitable material is mounted on the board 1 centrally in relation to the pivot bearing 6 and the disk 8 forms a backing behind the board 1. The pivot 9 holds the disks 7 and 8 centrally to the board 1 and said disks cover the slots 2, 3, 4 and 5 and are held together by the rivet pins 10 through said slots, so that in turning the disks the travel of same is limited by the length of said slots.

The figures 11 are painted or printed partly on the board 1 and partly on the disk 7 and the end walls of the slots 2, 3, 4 and 5 coöperate with the pins 10 in bringing the parts of the figures on the board 1 in register with the parts of the figures on the disk 7.

The numeral 12 is painted or printed on the rear disk 8 and is in register with a corresponding window through the board near the top when the pins 10 are against the walls of the slots at one end and the numeral 13 is painted or printed on the rear disk 8 adjacent to the numeral 12 and appears through the said window when the said pins reach the other end wall of the slots.

The result of this movement is to disclose twelve figures when the numeral 12 appears, through the window and to disclose thirteen figures when the numeral 13 appears through the window and it is in turning these disks that the extra figure is lost or gained and that is of course the puzzle to be elucidated by the curious investigator and it is the parts that make up this puzzle substantially as shown and described that form the subject matter of the specification and drawings in this invention.

The disks may be turned by means of the crank lever 15, connecting rod 16 and handle 17.

In the operation of this amusement device as explained the disk is turned from right to left and from left to right, and when turned to disclose the numeral 13 the full figures are disclosed and when turned back to 12 the figures from the second to the thirteenth inclusive or parts of the figures on the back ground lose one-twelfth of the size in each instance. From the second to the thirteenth means twelve-twelfths make a complete figure consequently one figure is completely lost to view. The opposite occurs in returning the disk to the numeral 13.

What I claim is:—

1. In a puzzle, an outer disk having pictures or characters thereon at the edge portion, a rotatable rear member secured to said disk and a middle sheet member having pictures or characters thereon adapted to complete the aforesaid pictures and characters and formed to limit the travel of the outer disk to bring the parts of the pictures or characters into register on both forward and return rotation.

2. In a puzzle, an outer disk having pictures or characters in parts thereon, a rear disk of larger diameter pivotally secured to said outer disk by a central pivot pin, a board or sheet member forming a bearing for said pivot pin and having limiting slots under said outer disk and a window above said disk and surrounding said outer disk pictures or characters or parts thereof registering with the pictures on said outer disk, pins from said disks through said slots and limiting the rotation of said disks and bringing the picture parts into register from disk to board and vice versa, said rear disk having thereon the numerals 12 and 13 corresponding to the number of pictures visible in the two positions of the disks respectively and means for turning said disks.

Signed at the city of Montreal, Province of Quebec, Dominion of Canada, this 17th day of November, 1919.

EMIL LANGE.